(12) United States Patent
Choi et al.

(10) Patent No.: US 7,957,162 B2
(45) Date of Patent: Jun. 7, 2011

(54) SWITCH MODE POWER SUPPLY AND DRIVING METHOD THEREOF

(75) Inventors: Hang-Seok Choi, Gunpo (KR); Jae-Hwoan Chi, Seoul (KR)

(73) Assignee: Fairchild Korea Semiconductor, Ltd., Bucheon (KR)

( * ) Notice: Subject to any disclaimer, the term of this patent is extended or adjusted under 35 U.S.C. 154(b) by 810 days.

(21) Appl. No.: 11/888,488

(22) Filed: Aug. 1, 2007

(65) Prior Publication Data
US 2008/0130324 A1    Jun. 5, 2008

(30) Foreign Application Priority Data

Nov. 30, 2006  (KR) .................. 10-2006-0119726

(51) Int. Cl.
*H02M 3/335*    (2006.01)
(52) U.S. Cl. ............. 363/21.13; 363/21.16; 363/21.18
(58) Field of Classification Search ......... 363/21.12, 363/21.13, 21.16, 21.18
See application file for complete search history.

(56) References Cited

U.S. PATENT DOCUMENTS

| | | | |
|---|---|---|---|
| 4,937,728 A | 6/1990 | Leonardi | |
| 5,689,407 A | 11/1997 | Marinus et al. | |
| 5,703,764 A | 12/1997 | Hermann et al. | |
| 5,852,550 A * | 12/1998 | Majid et al. | 363/21.05 |
| 5,892,672 A * | 4/1999 | Preller | 363/97 |
| 5,920,466 A | 7/1999 | Hirahara | |
| 5,982,640 A * | 11/1999 | Naveed et al. | 363/21.15 |
| 6,166,926 A * | 12/2000 | Nath et al. | 363/21.03 |
| 6,252,783 B1 | 6/2001 | Huh et al. | |
| 6,385,061 B1 * | 5/2002 | Turchi et al. | 363/21.15 |
| 6,646,894 B2 | 11/2003 | Hong et al. | |
| 2007/0008748 A1 * | 1/2007 | Tang | 363/21.12 |

* cited by examiner

*Primary Examiner* — Adolf Berhane
*Assistant Examiner* — Fred E Finch, III
(74) *Attorney, Agent, or Firm* — Sidley Austin LLP

(57) ABSTRACT

The present invention relates to a switch mode power supply and a driving method for reducing switching loss and audible noise in the burst mode. The switch mode power supply includes a main switch, a power supply, an output unit, and a switch controller. The power supply includes a transformer having a primary coil connected to the main switch, and supplies power to a secondary coil of the transformer according to the operation of the main switch. The output unit is connected to the secondary coil of the transformer and outputs power supplied to the secondary coil of the transformer. The switch controller receives a feedback signal corresponding to the output voltage of the output unit, a sense signal corresponding to the current flowing to the main switch, and a sync signal corresponding to the voltage difference at the main switch, controls the on/off of the main switch, and determines whether to start the burst mode by using the feedback signal, and maintains the switching operation forcibly off period in the burst mode so that the reference frequency of burst switching may be less than a predetermined value.

19 Claims, 5 Drawing Sheets

SWITCH MODE POWER SUPPLY AND DRIVING METHOD THEREOF

CROSS-REFERENCE TO RELATED APPLICATION

This application claims priority to and the benefit of Korean Patent Application No. 10-2006-0119726 filed in the Korean Intellectual Property Office on Nov. 30, 2006, the entire content of which is incorporated herein by reference.

BACKGROUND

1. Field of the Invention

The present invention relates to a switch mode power supply (SMPS). More particularly, the present invention relates to a quasi-resonant switching type SMPS and a driving method thereof.

2. Description of the Related Art

An SMPS is a device for rectifying an input AC voltage into an input DC voltage (dc-link voltage) and converting the input DC voltage into a DC output voltage having a different level. The DC output voltage can be greater than or equal to the input DC voltage. The SMPS is generally used for battery power supplies that power electronic devices, and particularly, mobile terminals or laptop computers.

The quasi-resonant switching mode based SMPS includes a quasi-resonant converter for supplying power according to switching by a main switch.

FIG. 1 shows a relationship between the output power of a conventional quasi-resonant SMPS and a switching frequency of the main switch.

As shown in FIG. 1, the switching frequency decreases as the output power of the SMPS increases. In detail, the output power depends on the load connected to the SMPS. When the load is light, the peak of the current flowing to the drain of the main switch is reduced and the switching frequency is increased, which is shown by the dotted line (a) of FIG. 1. The increase of the switching frequency under light load condition generates a switching loss. To prevent this, the conventional quasi-resonant converter restricts the switching frequency for light loads at some predetermined value, approximately independent from the output power, as shown in FIG. 1(b).

However, when the switching frequency of the main switch is restricted to a predetermined value, it is a challenge to perform switching at the lowest switch voltages. This non-optimal operation at low switching voltages is disadvantageous and leads to a switching loss. This switching loss is also enhanced in the case of a large input voltage. Therefore, for low loads connected to an output terminal of the SMPS, it would be desirable to increase the efficiency of the burst mode switching operation.

The burst mode switching operation represents a repeated switching operation that is stopped for a predetermined time after the SMPS outputs the power.

FIG. 2 shows a burst switching reference period when the load of the quasi-resonant SMPS is increased. When a power device performs a burst mode operation, the reference frequency is typically below 2-3 kHz, which is the frequency audible to a person, so that the person can hear no audible noise caused by the burst switching. However, as the load current is gradually increased, the interval, in which no switching is performed during the burst mode operation, is gradually reduced changing the burst mode into the normal mode. In this normal mode operation of the SMPS the frequency of the noise may move into the 2-3 kHz frequency range, which is audible to the user, which is undesirable.

The above information disclosed in this Background section is only for enhancement of understanding of the background of the invention and therefore it may contain information that does not form the prior art that is already known in this country to a person of ordinary skill in the art.

SUMMARY

Briefly and generally, embodiments of the present invention include an SMPS and a driving method thereof having the advantage of reducing a switching loss and a noise in the audible frequency range.

In one aspect of the present invention, a switch mode power supply (SMPS) includes: a main switch; a power supply including a transformer having a primary coil connected to the main switch, and supplying power to a secondary coil of the transformer according to the operation of the main switch; an output unit connected to the secondary coil of the transformer and outputting the power supplied to the secondary coil; and a switch controller for receiving a feedback signal corresponding to an output voltage of the output unit, a sense signal corresponding to the current flowing to the main switch, and a sync signal corresponding to the voltage difference at the main switch, and controlling the on/off state of the main switch, wherein the switch controller determines whether to start the burst mode by using the feedback signal, and maintains a switching operation off period for longer than a predetermined time by using a switching operation forcibly off period in the burst mode.

The switch controller controls the switching operation on period by counting the switching operations of the main switch in the burst mode.

The switch controller counts the switching operations of the main switch by using the gate signal for controlling the on/off state of the main switch during the switching operation on period, and the switch controller prevents the switching operation of the main switch during the switching operation forcibly off period when the switching operation on period is finished.

The switch controller includes: a burst mode determiner for determining the start state of the burst mode by using the feedback signal; a burst mode controller for maintaining the switching operation forcibly off period and controlling the switching operation on period; a sync detector for sensing the valley of the sync signal; and a PWM controller, synchronized at the time when the sync detector senses the valley of the sync signal, for determining the turn-on time of the main switch, and determining the turn-off state of the main switch by using the burst reference voltage and the detection signal in the burst mode or determining the turn-off state of the main switch when the switching on period is finished.

The burst mode determiner determines the switch mode power supply to be driven by the burst mode driving and notifies the burst mode controller of the determination result when the first voltage corresponding to the feedback signal is less than the burst threshold voltage during the burst enable time.

The burst mode determiner includes: a first comparator for comparing the voltage that corresponds to the feedback signal and the burst threshold voltage; an inverter for inverting a first signal output by the first comparator; a burst enable delay for determining whether the first voltage is less than the burst threshold voltage for the burst enable time by using the signal output from the inverter; a first logical operator for performing a logical operation on the signal that corresponds to the determination result of the burst enable delay and the signal output by the inverter; a first flip-flop for outputting a second level (high) second signal when the signal output by the first logical operator is a first level (high); a first switch being turned on in response to the second-level second signal; a reference current source connected to a first terminal of the first switch; and a first resistor connected to a second terminal of the first switch.

The first logical operator is an AND gate for outputting a high-level signal when the input signals are high level, the first level being high level.

The burst mode controller receives a gate signal for controlling the main switch, the first signal, and first and second inverted signals inverted by the inverter, and transmitting the result that is generated by sensing the switching operation on period and the switching operation forcibly off period to the PWM controller.

The burst mode controller includes: a second AND gate for receiving the first signal and the second signal and performing a logical operation on the first signal and the second signal; a third AND gate for receiving the second signal and the gate signal to perform a logical operation on the same, and generating a switching sensing signal; a fourth AND gate for receiving the first and second inverted signals and performing a logical operation on the same; a second flip-flop having a set terminal connected to an output terminal of the second AND gate, and generating a third signal having an enable or disable level according to a signal input to the set terminal and a signal input to the reset terminal; an on counter for counting the switching operations while the third signal has an enable level, determining whether the number of switching operations corresponding to the switching operation on period is finished according to the counting result, and generating a fourth signal according to the determination result; an off counter for determining whether the switching operation forcibly off period is finished after the switching operation on period is finished during the period in which the third signal has an enable level, and generating a fifth signal according to the determination result; a fifth AND gate for receiving the first signal and a signal that is generated by inverting the third signal, and generating a sixth signal; and a sixth AND gate for receiving the fifth signal and the first signal and generating a seventh signal, wherein the fifth signal is input to the reset terminal of the second flip-flop.

The on counter generates a high-level fourth signal when the number of switching operations corresponding to the switching operation on period is finished; the off counter generates a high-level fifth signal when the switching operation forcibly off period is finished; and the enable level is a high level, and the disable level is a low level.

The PWM controller receives an eighth signal output by the fourth AND gate, the fourth signal, the sixth signal, the seventh signal, a sync signal, a sense signal, a reference feedback voltage corresponding to the feedback signal, and a burst reference voltage generated by the first resistor and the current of the first current source, and generates a gate driver control signal; and the SMPS further includes a gate driver for generating the gate signal according to the gate driver control signal output by the PWM controller.

The PWM controller includes: a second comparator including a first inverting terminal for receiving the reference feedback voltage, a second inverting terminal for receiving the burst reference voltage, and a non-inverting terminal for receiving the sense signal, comparing the burst reference voltage and the voltage of the sense signal, and generating a comparison signal according to the comparison result; an oscillator for generating clock signals, and changing the clock signals from a third level to a fourth level in synchronization with the sync signal; a third flip-flop having a set terminal connected to an output terminal of the oscillator, and receiving the comparison signal through the reset terminal; a first OR gate for receiving the fourth signal and the eighth signal; a second OR gate for receiving the sixth signal and the seventh signal; a fourth flip-flop having a set terminal connected to an output terminal of the first OR gate and a reset terminal connected to an output terminal of the second OR gate; and a NOR gate having input terminals respectively connected to an inverting output terminal of the third flip-flop, an output terminal of the fourth flip-flop, and an output terminal of the oscillator, and generating the gate driver control signal.

The fourth flip-flop generates a high-level ninth signal at the output terminal when the signal input to the set terminal is high level, and generates a low-level ninth signal at the output terminal when the signal input to the reset terminal is high level; the third flip-flop generates a low-level signal at the inverting output terminal when the signal input to the set terminal is high level, and generates a high-level signal at the inverting output terminal when the signal input to the reset terminal is high level; and the third level is high level, and the fourth level is low level.

The NOR gate generates a high-level gate driver control signal when the input mode signal is low level, and the gate driver generates the high-level gate signal corresponding to the high-level gate driver control signal, and the main switch is an n-channel transistor.

The main switch and the switch controller are respectively configured into a pack.

The main switch and the switch controller are configured into a pack.

In another aspect of the present invention, a method for driving a switch mode power supply for converting an input voltage into an output voltage according to the on/off of a main switch includes: a) determining a drive mode of the switch mode power supply by using a feedback signal and a burst threshold voltage corresponding to the output voltage; b) counting the switching operation of the main switch when the drive mode is the burst mode according to the determination result of a); and c) maintaining the switching operation off period for longer than a predetermined time when the switching operation on period is finished according to the counting result of b).

The switching operation off period includes a switching operation forcibly off period for preventing the switching operation for the predetermined time, and further includes d) counting the switching operation forcibly off period.

The method further includes turning on the main switch in synchronization with the time when the voltage at the main switch senses the valley.

DETAILED DESCRIPTION

Figure 1:
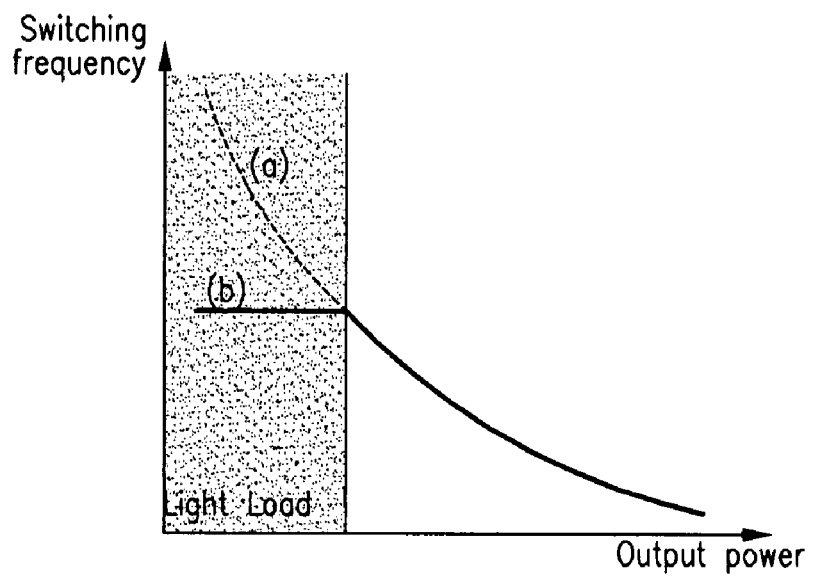
FIG. 1 shows a relationship between output power of a conventional quasi-resonant SMPS and a switching frequency of the main switch.
Figure 2:
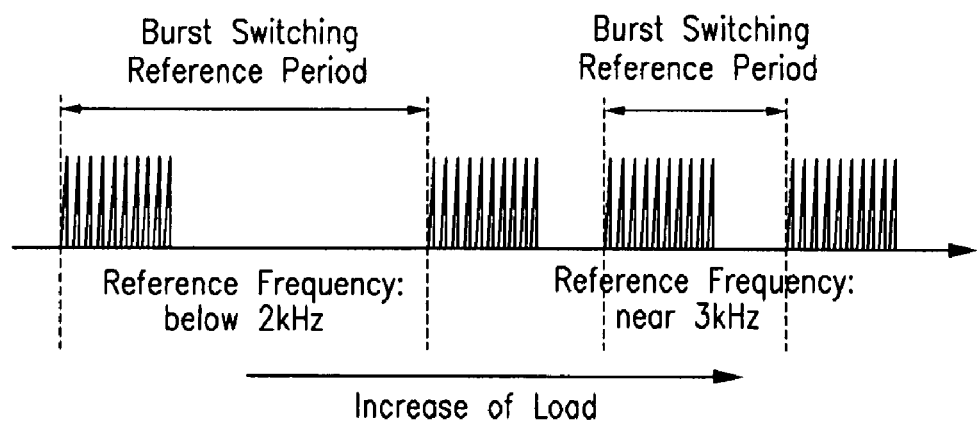
FIG. 2 shows a burst switching reference period when the load of the quasi-resonant SMPS is increased.

In the following detailed description, only certain exemplary embodiments of the present invention are shown and described, simply by way of illustration. As those skilled in the art will realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through one or more additional elements.

A quasi-resonant converter and an SMPS using it will now be described with reference to the drawings. The switching operation represents an operation in which a main switch is turned on, maintains the on state for a predetermined time, is then turned off, and maintains the off state until it is turned on again.

Figure 3:
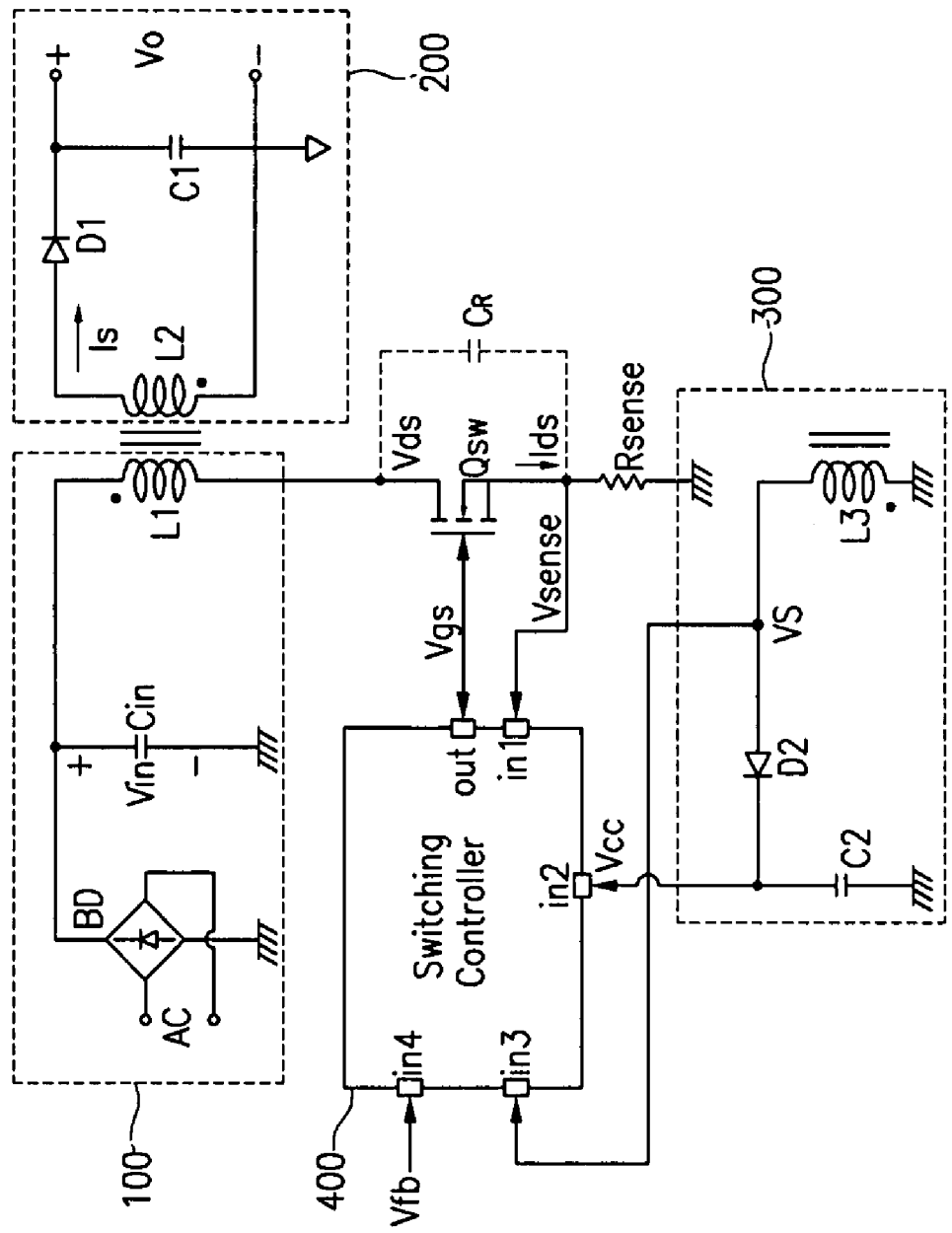
FIG. 3 shows a switch mode power supply.

FIG. 3 shows a switch mode power supply which may include a main switch Qsw, a power supply 100, an output unit 200, a bias voltage supplier 300, and a switch controller 400.

The power supply 100 may include a bridge diode BD for rectifying an AC input voltage, a capacitor Cin for smoothing the rectified voltage, and a primary coil L1 of a transformer having a first terminal connected to the capacitor Cin. The power supply 100 can convert the AC input voltage into a DC voltage Vin assisted by the bridge diode BD and the capacitor Cin. The power supply 100 can supply power to the secondary coil L2 of the transformer, which is part of the output unit 200, according to the duty of the switching transistor Qsw.

The output unit 200 may include the secondary coil L2 of the transformer, a diode D1 having an anode connected to a first terminal of the secondary coil L2 of the transformer, and a capacitor C1 connected between a cathode of the diode D1 and the ground. Here, the voltage at the capacitor C1 is an output voltage V0.

The bias voltage supplier 300 can include a secondary coil L3 of the transformer, a diode D2 having an anode connected to a first terminal of the secondary coil L3 of the transformer, and a capacitor C2 connected between a cathode of the diode D2 and the ground. The switch controller 400 can be generally realized by using an IC, and the bias voltage supplier 300 may supply a bias voltage Vcc for operating the IC. When the switching transistor Qsw starts switching, the secondary coil L3 of the transformer and the diode D2 can be operated to charge the capacitor C2 with the bias voltage Vcc. Also, the bias voltage supplier 300 may transmit a sync signal VS corresponding to the drain-source voltage Vds of the switching transistor Qsw to the switch controller 400.

The switch controller 400 can receive a feedback signal Vfb, a sense signal Vsense for sensing the current Ids flowing through the switching transistor Qsw, and a sync signal VS, and can output a gate signal Vgs for controlling the on/off state of the switching transistor Qsw. The sense signal Vsense may be a voltage that is generated by the current Ids flowing to the sense resistor Rsense and it will be called a sense voltage Vsense hereinafter. The switch controller 400 can turn on the switching transistor Qsw when the voltage difference between the drain and the source of the switching transistor Qsw is near or at its minimum, or valley. Here, the switch controller 400 can use the sync signal VS transmitted from the bias voltage supplier 300 to sense the voltage difference between the drain and the source of the switching transistor Qsw. The feedback signal Vfb can be a signal carrying information corresponding to the output voltage V0 and can be used to determine the turn-off time of the switching transistor Qsw. The feedback signal Vfb may be generated by using a photo coupled photodiode and a transistor, which will not be described since it is well known to a person of an ordinary skill in the art.

The switch controller 400 may determine the operation mode by using the feedback signal Vfb. In detail, the SMPS is operable in the normal switching operation mode (normal mode) and the burst switching operation mode (burst mode). The switch controller 400 can sense the reduction of the voltage of the feedback signal Vfb when the load connected to the output unit of the SMPS is a light load, and controls the SMPS to be operated in the burst mode when the voltage of the feedback signal Vfb is less than the burst threshold voltage Vburst. In the burst mode the SMPS can forcibly turn off switching operation for a minimum time. The period for forcibly turning off the switching operation for a predetermined time will be called a switching operation forcibly off period.

Figure 4:
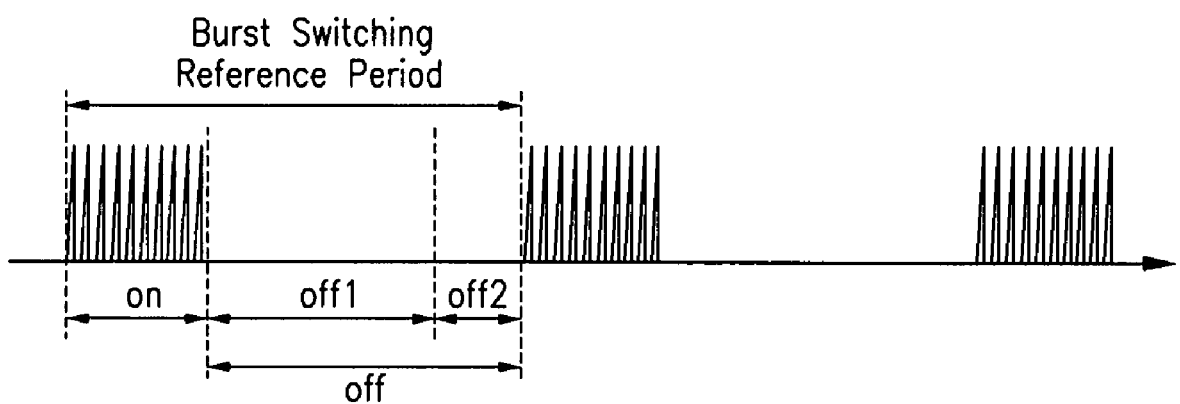
FIG. 4 shows on and off periods of the switching operation.

FIG. 4 illustrates a burst mode operation of the SMPS. FIG. 4 shows on and off periods of the switching operation. The SMPS can reduce the burst mode reference frequency (reference frequency) to reduce a switching loss in the case of a light load in the burst mode. The reference frequency can be acquired by dividing the switching operation on period by the burst switching reference period (reference period). Here, in the burst mode the reference period includes the switching-operation-on period and the switching-operation-off period.

The SMPS can compare the voltage of the feedback signal Vfb and a reference voltage VR, and switch the main switch when the voltage of the feedback signal Vfb is greater than the reference voltage VR. When the SMPS is operated in the burst mode, the reference voltage is the burst threshold voltage Vburst. In this mode the switching frequency can be tuned by the feedback signal Vfb, and the SMPS can prevent the switching operation of the main switch during the switching-operation-forcibly-off period off1, even when the voltage of the feedback signal Vfb is greater than the burst threshold voltage Vburst. The switching-operation-off-period may include the switching-operation-forcibly-off-period off1, and a period off2 until the time when the voltage of the feedback signal Vfb reaches the burst threshold voltage Vburst after the period off1. Therefore, since the reference period is the sum of the switching-operation-on-period and the switching-operation-off-period when the SMPS is operated in the burst mode, the reference frequency is lowered. When the SMPS is operated in the burst mode, the reference frequency of the switching operation may have a value that is less than a predetermined frequency. In these embodiments the steep change of the reference frequency depending on the input voltage is prevented. The predetermined frequency is lower than the audible frequency bandwidth.

Figure 5:
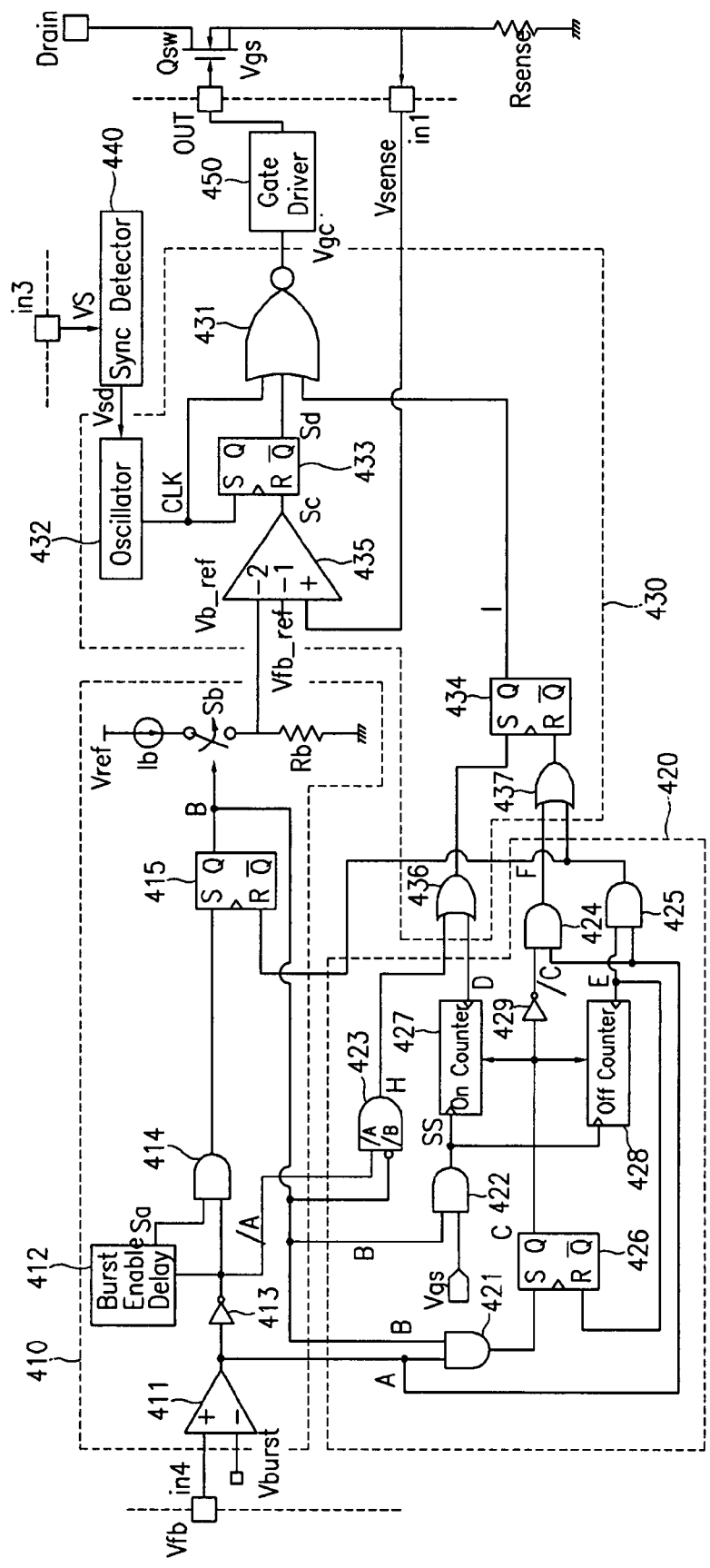
FIG. 5 shows a switch controller and a main switch.
Figure 6:
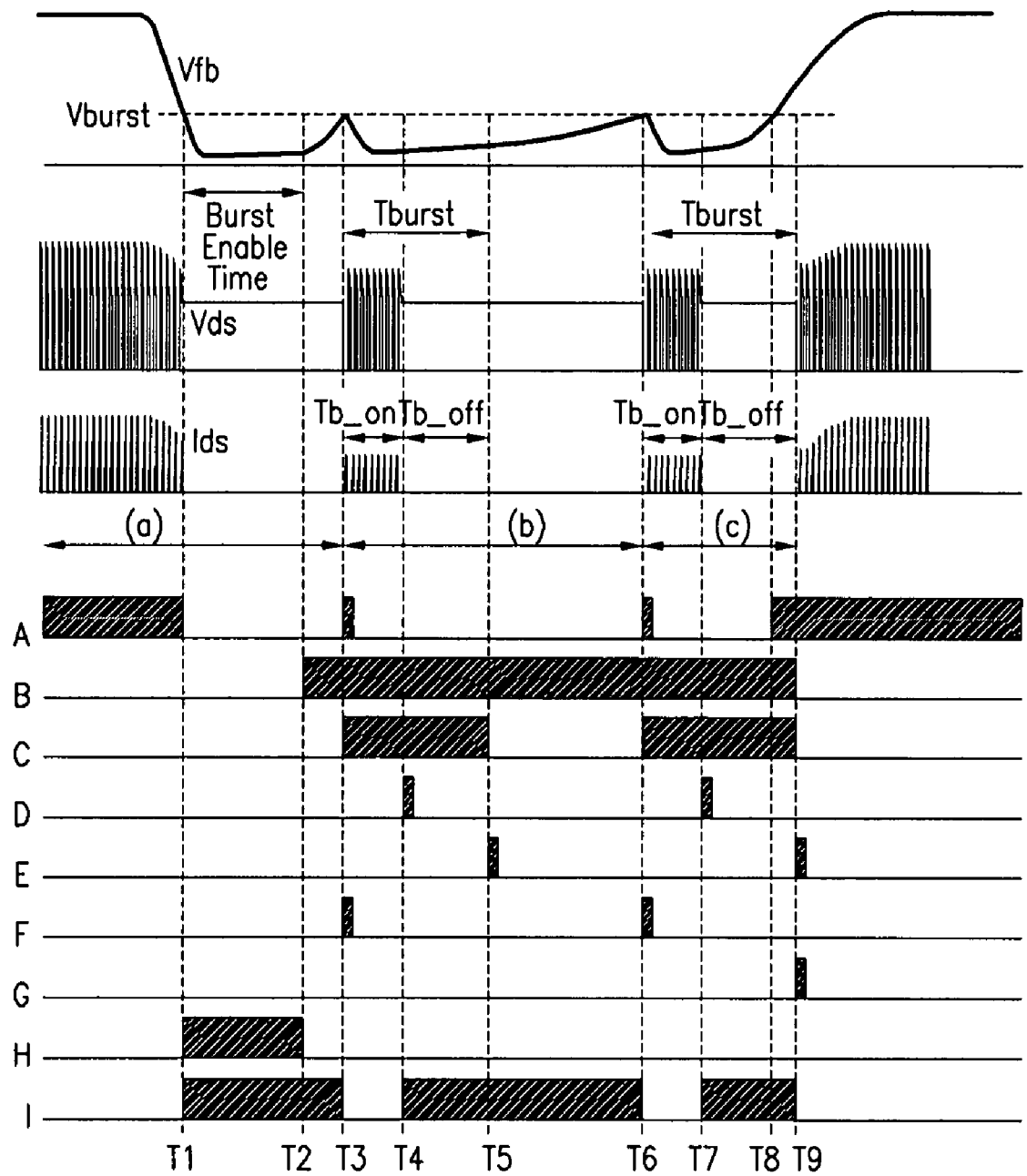
FIG. 6 shows an input signal, an output signal, and a driving signal of a switch controller.

FIGS. 5 and 6 illustrate the SMPS and its driving method. FIG. 5 shows the switch controller 400 and the main switch Qsw. FIG. 6 shows an input signal, an output signal, and a driving signal of the switch controller 400 in an embodiment.

FIG. 5 shows that the SMPS may include a burst mode determiner 410, a burst mode controller 420, a PWM controller 430, a sync detector 440, and a gate driver 450.

The burst mode determiner 410 can include a first comparator 411, a burst enable delay 412, an inverter 413, a first AND gate 414, a first flip-flop 415, a reference current source Ib, a reference voltage source Vref, and a resistor Rb.

The first comparator 411 can receive a burst threshold voltage Vburst through an inverting terminal (−), and a voltage of a feedback signal Vfb through a non-inverting terminal (+). The first comparator 411 may compare the burst threshold voltage Vburst and the voltage of the feedback signal Vfb, generate a high-level first signal A when the voltage of the feedback signal Vfb is greater than the burst threshold voltage Vburst, and generate a low-level first signal A when the voltage of the feedback signal Vfb is less than the burst threshold voltage Vburst.

The inverter 413 can transmit a first inverted signal /A that is generated by inverting the first signal A to the burst enable delay 412, a first AND gate 414, and an AND gate 423 of the burst mode controller 420.

The burst enable delay 412 may determine the start of the burst mode according to the first inverted signal /A. In more detail, the burst enable delay 412 may determine whether the voltage of the feedback signal Vfb is less than the burst threshold voltage Vburst during a burst enable time BET, and it may output a control signal for starting the burst mode to the first AND gate 414 when the voltage of the feedback signal Vfb is less than the burst threshold voltage Vburst during the burst enable time (BET). In the SMPS, the control signal Sa for starting the burst mode has the high level, and it has the low level when there is no need to start the burst mode. By determining whether the voltage of the feedback signal Vfb is less than the burst threshold voltage Vburst, the change of the SMPS operation mode caused by the temporary load reduction is prevented.

The first AND gate 414 can receive the first inverted signal /A and the control signal Sa for starting the burst mode through two input terminals, and output a high-level signal to the first flip-flop 415 when the two signals are high-level.

The first flip-flop 415 may include a set terminal S, a reset terminal R, an output terminal Q, and an inverting output terminal /Q. The first flip-flop 415 can output a high-level signal at the output terminal Q when the input signal at the set terminal S is high-level and the input signal at the reset terminal R is low-level. When the input signal at the reset terminal R is high-level and the input signal at the set terminal S is low-level, a low-level signal is output at the output terminal Q, and when the input signals input to the set terminal S and the reset terminal R are both low-level, the level of the signal output at the output terminal Q is unchanged. Therefore, when the signal output to the set terminal S from the first AND gate 414 is high-level, a second signal B at the output terminal Q becomes high-level, and the switch Sb is turned on in response to the high-level second signal B.

The current of the reference current source Ib can flow to the resistor Rb through the turned-on switch Sb, and the voltage generated by the reference current source Ib and the resistor Rb is transmitted to the inverting terminal (−) of a second comparator 435.

The burst mode controller 420 may include second to sixth AND gates 421 to 425, a second flip-flop 426, an on counter 427, an off counter 428, and an inverter 429.

The second AND gate 421 can receive the first signal A and the second signal B, and transmit a high-level signal to the set terminal S of the second flip-flop 426 when the first and second signals A and B are high-level. The second flip-flop 426 can perform a logical operation in a manner similar to that of the first flip-flop 415, and outputs a third signal C at its Q output terminal, that is generated according to the result of the logical operation.

The third AND gate 422 can receive the second signal B and a gate signal Vgs, and transmit a high-level switching detection signal SS to the on-counter 427 and the off-counter 428 when the two signals are high-level.

The fourth AND gate 423 may receive the first inverted signal /A and a second inverted signal /B, and transmit a high-level eighth signal H to the PWM controller 430 when the two signals are high-level. The eighth signal H may maintain the turn-off state of the main switch Qsw during the burst enable time BET.

The set terminal S of the second flip-flop 426 can be connected to an output terminal of the second AND gate 421, and the reset terminal R thereof connected to an output terminal of the off counter 428. The output terminal Q may be connected to the on-counter 427, the off-counter 428, and the inverter 429. The third signal C output from the output terminal Q is a signal for controlling the on-counter 427 and the off-counter 428, and the third signal C can have a high level as an enable level and a low level as a disable level. During the period in which the third signal C is high level, the on-counter 427 and the off-counter 428 can sense the on/off state of the main switch and maintain the switching-operation-on-period Tb_ON and the switching-operation-forcibly-off-period Tb_OFF. The on-counter 427 and the off-counter 428 may not be operated during the period in which the third signal C is low level.

The on-counter 427 can sense the high-level third signal C as an enable signal to start its operation and sense the low-level third signal C as a disable signal to stop the operation. The on-counter 427 can receive a switching detection signal SS to count the number of times the switching operations were performed. When a predetermined number of switching operations is counted or when the number of switching operations corresponding to a predetermined switching-operation-on-period Tb_ON is sensed, the on-counter 427 can transmit a fourth signal D to a first OR gate 436 of the PWM controller 430. In this instance, the on-counter 427 can output a high-level pulse signal as the fourth signal D when a predetermined number of switching operations is counted or when the number of switching operations corresponding to a predetermined switching operation on period Tb_ON is sensed. In an embodiment, when the switching-operation-on-period is set and a corresponding number of switching operations is counted, the fourth signal D having a high-level pulse can be set to be output.

The off-counter 428 can sense the high-level third signal C as an enable signal to start the operation and senses the low-level third signal C as a disable signal to stop the operation. The off-counter 428 can receive the switching detection signal SS to count the number of switching operations. When the number of switching operations corresponds to the switching-operation-on-period Tb_ON, the off counter 428 can output a fifth signal E to the sixth AND gate 425 and to the reset terminal R of the second flip-flop 426 after the switching-operation-forcibly-off-period Tb_OFF. When the switching detection signal SS is maintained at the low level for a predetermined time after the switching-operation-on-period Tb_ON is finished, the off counter 428 can determine that the switching-operation-forcibly-off-period Tb_OFF is finished, and output a high-level pulse signal as the fifth signal E.

The fifth AND gate 424 may receive a third inverted signal /C output by the inverter 429 and the first signal A, and transmit a high-level sixth signal F to a second OR gate 437 of the PWM controller 430 when the two signals are high level. The sixth signal F can notify the start of the switching-operation-on-period Tb_ON after the SMPS is started in the burst mode.

The sixth AND gate 425 may receive the first signal A and the fifth signal E, and output a high-level seventh signal G when the two signals are high-level. When the voltage of the feedback signal becomes greater than a burst threshold voltage during the burst period Tburst, the seventh signal G can be synchronized with the time when the burst period is finished controlling the turning on state of the main switch. The burst period Tburst is a sum of the switching-operation-on-period and the switching-operation-forcibly-off-period.

The inverter 429 can receive the third signal C and output the third inverted signal /C to the fifth AND gate 424.

The sync detector 440 can use a sync signal VS to sense the valley of the voltage between the drain terminal and the source terminal of the main switch Qsw and controls the turn-on state of the main switch Qsw. In more detail, on sensing the valley of the voltage between the drain terminal and the source terminal of the main switch Qsw, the sync detector 440 can transmit a detection signal Vsd to the oscillator 432.

The PWM controller 430 can include a NOR gate 431, an oscillator 432, a third flip-flop 433, a fourth flip-flop 434, a second comparator 435, a first OR gate 436, and a second OR gate 437.

The first OR gate 436 can receive the fourth signal D and the eighth signal H, generate a high-level signal when one of the two signals is high level or a low-level signal when the two signals are low level, and output the generated signal to the set terminal S of the fourth flip-flop 434.

The second OR gate 437 can receive the sixth signal F and the seventh signal G, generate a high-level signal when one of the two signals is high level or a low-level signal when the two signals are low level, and output the generated signal to the reset terminal R of the fourth flip-flop 434.

The fourth flip-flop 434 may perform a logical operation on the signals that are input from the first and second OR gates 436 and 437, and transmit a ninth signal I to the NOR gate 431 according to the result of the logical operation. The fourth flip-flop 434 can perform a logical operation analogously to the first flip-flop 415.

The second comparator 435 can receive a sense voltage Vsense through the non-inverting terminal (+), a reference feedback voltage Vfb_ref through the first inverting terminal (−1), and a burst reference voltage Vb_ref through the second inverting terminal (−2). When the burst mode is started, the second comparator 435 can receive a burst reference voltage Vb_ref from the burst mode determiner 410, and transmit a high-level comparison signal Sc to the reset terminal R of the third flip-flop 433 when the sense voltage Vsense is greater than the burst reference voltage Vb_ref. When the sense voltage Vsense is less than the burst reference voltage Vb_ref, the second comparator 435 can transmit a low-level comparison signal Sc to the reset terminal R of the third flip-flop 433. However, in the case of the normal mode other than the burst mode, the second comparator 435 may transmit a high-level comparison signal Sc to the reset terminal R of the third flip-flop 433 when the sense voltage Vsense is greater than the reference feedback voltage Vfb_ref, and transmit a low-level comparison signal Sc to the reset terminal R of the third flip-flop 433 when the sense voltage Vsense is less than the reference feedback voltage Vfb_ref.

The oscillator 432 may output clock signal CLK to the set terminal S of the third flip-flop 433. In this instance, the oscillator 432 may change the clock signal CLK to the low level according to the detection signal Vsd, transmitted from the sync detector 440.

The third flip-flop 433 can receive the clock signal CLK and the signal Sc, and transmit the signal Sd to the NOR gate 431 through the inverting output terminal/Q according to a result of the logical operation. The third flip-flop 433 performs a logical operation analogously to the first flip-flop 415.

The NOR gate 431 can output a high-level gate driver control signal Vgc when the input signals are low level, and output a low-level gate driver control signal Vgc to the gate driver 450 when one of the input signals is high level. The gate driver 450 can transmit a gate signal Vgs for turning on the main switch Qsw to the main switch Qsw in correspondence to the high-level gate driver control signal Vgc, and transmit a gate signal Vgs for turning off the main switch Qsw to the main switch Qsw in correspondence to the low-level gate driver control signal Vgc. The main switch Qsw can be an n-channel type transistor, and has a gate terminal as a control terminal, and a drain terminal and a source terminal. Other types of switches, including BJT and IGBT types can be used as well. The main switch Qsw can be turned on when the voltage difference between the gate terminal and the source terminal is greater than the threshold voltage. The gate signal Vgs is a high voltage for turning on the main switch Qsw, or a low voltage signal for turning off the main switch Qsw.

An operation will now be described in detail with reference to FIG. 6. As shown in FIG. 6, when the voltage of the feedback signal Vfb becomes less than the burst threshold voltage Vburst, the first signal A can change from a high level to a low level at a time T1. When the first inverted signal /A maintains the high level during the burst enable time (BET), the burst enable delay 412 may determine that the voltage of the feedback signal Vfb is less than the burst threshold voltage Vburst and can transmit a control signal Sa for starting the burst mode to the first AND gate 414 during the burst enable time (BET).

The first AND gate 414 can receive a high-level first inverted signal /A and a high-level control signal Sa and output a high-level signal to the set terminal S of the first flip-flop 415. The first flip-flop 415 can output a high-level second signal B at the time T2. The first flip-flop 415 can output the high-level second signal B at the output terminal Q until a high-level seventh signal G is input to the reset terminal R. The switch Sb can be turned on by the high-level second signal B, and a burst reference voltage Vb_ref can be applied to the second inverting terminal (−2) of the second comparator 435.

At this time, on receiving the first inverted signal /A and the second inverted signal /B, the eighth signal H may maintain a high level from the time T1 to the time T2, and change to the low level after the time T2. Since the ninth signal I of the fourth flip-flop 434 can maintain a high level while the eighth signal H maintains the high level from T1 to T2, the output signal of the NOR gate 431 is a low level, and hence, the gate signal Vgs, output by the gate driver 450, turns off the main switch Qsw.

At the time T3, the voltage of the feedback signal Vfb can become essentially equal to the burst threshold voltage Vburst so that the first signal A can become a high-level pulse. The third signal C output by the second flip-flop 426 may become a high-level according to the high-level signal output by the second AND gate 421. The on-counter 427 and the off counter 428 may sense the switching sense signal SS to sense the switching-operation-on-period Tb_ON and the switching-operation-forcibly-off-period Tb_OFF. In this instance, since the third inverted signal /C and the first signal A input to the fifth AND gate 424 are high level, the sixth signal F has a high level pulse while the first signal A is a high-level pulse. At the time T3, the ninth signal I can become low level since a high-level signal is input to the reset terminal R of the fourth flip-flop 434.

At the time T4, when the switching-operation-on-period Tb_ON is finished, the on-counter 427 can sense this finish to generate the fourth signal D having a high-level pulse, and the first OR gate 436 can transmit a high-level signal to the set terminal S of the fourth flip-flop 434, and the ninth signal I becomes high level.

At the time T5, when the switching-operation-forcibly-off-period Tb_OFF is finished, the off-counter 428 can sense this finish to generate the fifth signal E having a high-level pulse and transmit the generated fifth signal E to the reset terminal R of the second flip-flop 426. Also, the third signal C can become low level. In the SMPS, the period Tburst, which is the sum of the switching-operation-on-period Tb_ON and the switching-operation-off-period Tb_OFF in the burst mode will be referred to as a minimum reference period.

At the time T6, when the voltage of the feedback signal Vfb becomes equal to the burst threshold voltage Vburst, the first signal A can have a high-level pulse. The third signal C, output by the second flip-flop 426, can become high level according to the high-level signal output by the second AND gate 421. The on-counter 427 and the off-counter 428 may sense the switching sense signal SS to sense the switching-operation-on-period Tb_ON and the switching-operation-forcibly-off-period Tb_OFF. In this instance, since the third inverted signal /C and the first signal A, input to the fifth AND gate 424 are high level, the sixth signal F can have a high-level pulse during the period in which the first signal A is a high-level pulse. At the time T6, since a high-level signal is input to the reset terminal R of the fourth flip-flop 434, the ninth signal I can become low level.

At the time T7, when the switching-operation-on-period Tb_ON is finished, the on-counter 427 can sense this finish to generate the fourth signal D having a high-level pulse and the first OR gate 436 can transmit a high-level signal to the set terminal S of the fourth flip-flop 434. Correspondingly, the ninth signal I can become high level. And at the time T7, the switching-operation-forcibly-off-period Tb_OFF starts.

At the time T8, the voltage of the feedback signal Vfb becomes greater than the burst threshold voltage Vburst, the first signal A may become a high-level signal.

At the time T9, when the switching-operation-forcibly-off-period Tb_OFF is finished, the off counter 428 may sense this finish and generates the fifth signal E having a high-level pulse and transmit the same to the reset terminal R of the second flip-flop 426. Thus the third signal C can become a low level. Since the first signal A and the fifth signal E are high level, the seventh signal G can become high level and be transmitted to the reset terminal R of the first flip-flop 415 and the reset terminal R of the fourth flip-flop 434. Accordingly, the second signal B and the ninth signal I may become low level.

After the time T9, since the switch Sb is turned off, the reference feedback voltage Vfb_ref, transmitted to the first inverting terminal (−1) of the second comparator 435, and the sense voltage Vsense can be compared to determine the turn-off of the main switch Qsw. Therefore, the SMPS is operated in the normal mode.

The SMPS can compare the burst reference voltage Vb_ref and the reference feedback voltage Vfb_ref with the sense voltage Vsense in the burst mode and the normal mode, and determine whether to turn off the main switch Qsw depending on the comparison result.

In the burst mode, when the sense voltage Vsense is greater than the burst reference voltage Vb_ref during the switching-operation-on-period Tb_ON, the signal Sd can become a high level, driven by the high-level signal Sc applied to the reset terminal R of the third flip-flop 433. The gate signal Vgs can become a low level and the main switch Qsw can be turned off according to the low-level gate driver control signal Vgc output by the NOR gate 431. While the main switch Qsw is turned off, the low-level signal Sc can be transmitted to the reset terminal R of the third flip-flop 433 since the sense voltage Vsense is less than the reference feedback voltage Vfb_ref. The sync detector 440 may detect the valley of the voltage difference Vds of the drain and source terminals of the main switch Qsw and transmit a sync detection signal Vsd to the oscillator 432. The oscillator 432 can change the clock signals CLK into low level signals according to the sync detection signal Vsd.

Since the signals input to the NOR gate 431 are low level, a high-level gate driver control signal Vgc can be transmitted to the gate driver 450. The gate driver 450 may transmit the high-level gate signal Vgs to the main switch Qsw in correspondence to the high-level gate driver control signal Vgc. The main switch Qsw can be turned on.

Accordingly, the SMPS and the driving method thereof can set the switching-operation-on-period and the switching-operation-forcibly-off-period in the burst mode to control the switching operation according to the predetermined period. Hence, the reference frequency determined by the switching groups in the burst switching is maintained below a predetermined value irrespective of the load condition.

Also, the switching frequency can be varied according to the input voltage, and since the minimum switching-operation-forcibly-off-period is set irrespective of the input voltage in the burst mode, the reference frequency deviation in the burst mode can be reduced by attenuating the deviation of the switching frequency that is generated according to the input voltage. In the SMPS, the reference frequency can be lowered since the reference frequency includes the switching-operation-forcibly-off-period in the burst mode. In detail, the reduction of the reference frequency deviation will now be described referring to the following assumption. First, the case in which the period of the switching operation of the main switch is, for example, 20 μsec and the switching operation frequency is, for example, 50 Khz, when the input voltage is 90 Vac, and the case in which the period of the switching operation of the main switch is 10 μsec and the switching operation frequency is 100 Khz when the input voltage is 265 Vac will be compared. In this instance, the switching-operation-forcibly-off-periods can be set to be 600 μsec for both cases, and it is assumed that the generated number of switching operations during the switching-operation-on-period is, for example, 16 and the main switch is turned on after the switching-operation-forcibly-off-period in the burst mode.

In this case, assuming that the number of switching operations corresponding to the switching-operation-on-period is, for example, 16 and the main switch is turned on after the switching-operation-forcibly-off period in the burst mode, the switching-operation-on-period will take 320 μsec when the input voltage is 90 Vac, and the switching-operation-on-period will take 160 μsec when the input voltage is 265 Vac. The reference period can be 920 μsec when the input voltage is 90 Vac, and the reference period can be 760 μsec when the input voltage is 265 Vac. In the burst mode, the reference frequency can be, for example, 1.087 Khz when the input voltage is 90 Vac, and the reference frequency can be, for example 1.315 Khz when the input voltage is 265 Vac. Accordingly, the variation of the reference frequency following the input voltage can be reduced in the burst mode of the SMPS by setting the switching-operation-forcibly-off-period. Also, since the reference frequency is lower than 2 kHz, it is possible to avoid the frequency bandwidth that is sensitive to the user and thereby to reduce audible noise.

Power consumption caused by switching loss can be reduced by reducing the effective switching frequency through the burst operation. The power consumption P is proportional to the reference frequency in the burst mode as expressed in Equation 1.

$$P = \frac{1}{2}LI_{ds}^2 f_s \qquad \text{(Equation 1)}$$

In Equation 1, L is the inductance of the primary coil of the power supply, Ids is the current flowing to the source terminal from the drain terminal of the main switch, and fs is the reference frequency in the burst mode.

The embodiment is applicable to both an SMPS where the switching transistor Qsw and the switch controller 400 are formed within a single package and an SMPS where the switching transistor Qsw and the switch controller 400 as formed in separate packages.

While this invention has been described in connection with specific embodiments, it is to be understood that the invention is not limited to the disclosed embodiments, but, on the contrary, is intended to cover various modifications and equivalent arrangements included within the spirit and scope of the appended claims.

What is claimed is:

1. A switch mode power supply (SMPS) comprising:
   a main switch;
   a power supply including a transformer having a primary coil coupled to the main switch, and configured to supply power to a secondary coil of the transformer according to the operation of the main switch;
   an output unit coupled to the secondary coil of the transformer and configured to output the power supplied to the secondary coil; and
   a switch controller, configured to receive a feedback signal corresponding to an output voltage of the output unit, a sense signal corresponding to the current flowing to the main switch, and a sync signal corresponding to a voltage difference across the main switch, and to control the on/off state of the main switch, wherein
   burst mode determiner is configured to determine the switch mode power supply to be driven by the burst mode driving and notifies the burst mode controller of the determination when a first voltage corresponding to the feedback signal is less than a burst threshold voltage during a burst enable time
   the switch controller is configured to determine whether to start a burst mode by using the feedback signal, to drive the switch mode power supply in the burst mode when the feedback signal is less than a burst threshold voltage during a burst enable time, and to maintain a switching-operation-off-period for at least a predetermined time by using a switching-operation-forcibly-off-period in the burst mode so that the main switch remains in off state even when the feedback signal is greater than the burst threshold voltage.

2. The SMPS of claim 1, wherein
   the switch controller is configured to control a switching-operation-on-period by counting the switching operations of the main switch in the burst mode.

3. The SMPS of claim 2, wherein the switch controller is configured
   to count the switching operations of the main switch by using a gate signal for controlling the on/off state of the main switch during the switching-operation-on-period; and
   to prevent the switching operation of the main switch during the switching-operation-forcibly-off-period when the switching-operation-on-period is finished.

4. The SMPS of claim 3, wherein the switch controller comprises:
   a burst mode determiner, configured to determine the start state of the burst mode by using the feedback signal;
   a burst mode controller, configured to maintain the switching-operation-forcibly-off-period and to control the switching-operation-on-period;
   a sync detector, configured to sense the valley of the sync signal; and
   a PWM controller, synchronized at the time when the sync detector senses the valley of the sync signal, configured to determine a turn-on time of the main switch, and to determine a turn-off time of the main switch by using a burst reference voltage and a detection signal in the burst mode.

5. The SMPS of claim 4, wherein
   the burst mode determiner is configured to determine the switch mode power supply to be driven by the burst mode driving and notifies the burst mode controller of the determination when a first voltage corresponding to the feedback signal is less than the burst threshold voltage during a burst enable time.

6. The SMPS of claim 5, wherein the burst mode determiner comprises:
   a first comparator configured to compare the voltage that corresponds to the feedback signal and the burst threshold voltage;
   an inverter configured to invert a first signal output by the first comparator;
   a burst enable delay configured to determine whether the first voltage is less than the burst threshold voltage for the burst enable time by using the signal output from the inverter;
   a first logical operator configured to perform a logical operation on the signal that corresponds to the determination result of the burst enable delay and the signal output by the inverter;
   a first flip-flop configured to output a second signal in response to the signal output by the first logical operator;
   a first switch configured to be turned on in response to the second signal;
   a reference current source coupled to a first terminal of the first switch; and
   a first resistor coupled to a second terminal of the first switch.

7. The SMPS of claim 6, wherein
   the first logical operator is an AND gate configured to output a high-level signal when the input signals are high level.

8. The SMPS of claim 6, wherein the burst mode controller is configured
   to receive a gate signal for controlling the main switch, the first signal, and the signal inverted by the inverter; and
   to transmit the result of sensing the switching-operation-on-period and the switching-operation-forcibly-off-period to the PWM controller.

9. The SMPS of claim 8, wherein the burst mode controller comprises:
   a second AND gate configured to receive the first signal and the second signal and to perform a logical operation on the first signal and the second signal;
   a third AND gate configured to receive the second signal and the gate signal to perform a logical operation on the same, and to generate a switching sensing signal;
   a fourth AND gate configured to receive the first and second inverted signals and to perform a logical operation on the same;
   a second flip-flop configured to having a set terminal connected to an output terminal of the second AND gate, and to generate a third signal having an enable or disable level according to a signal input to the set terminal and a signal input to the reset terminal;

an on-counter configured to count the switching operations while the third signal has an enable level, to determine whether the number of switching operations corresponding to the switching-operation-on-period is finished according to the counting result, and to generate a fourth signal according to the result of the determination;

an off-counter configured to determine whether the switching operation forcibly off period is finished after the switching operation on period is finished during the period in which the third signal has an enable level, and to generate a fifth signal according to the determination result;

a fifth AND gate configured to receive the first signal and a signal that is generated by inverting the third signal, and generating a sixth signal; and a sixth AND gate configured to receive the fifth signal and the first signal and generating a seventh signal, wherein the fifth signal is input to the reset terminal of the second flip-flop.

10. The SMPS of claim 9, wherein:

the on-counter is configured to generate a high-level fourth signal when the number of switching operations corresponding to the switching operation on period does not grow anymore;

the off counter is configured to generate a high-level fifth signal when the switching-operation-forcibly-off-period is finished; and the enable level is a high level, and the disable level is a low level.

11. The SMPS of claim 10, wherein:

the PWM controller is configured to receive an eighth signal output by the fourth AND gate, the fourth signal, the sixth signal, the seventh signal, a sync signal, a sense signal, a reference feedback voltage corresponding to the feedback signal, and a burst reference voltage generated by the first resistor and the current of the first current source, and to generate a gate driver control signal; and the SMPS further includes a gate driver configured to generate the gate signal according to the gate driver control signal output by the PWM controller.

12. The SMPS of claim 11, wherein the PWM controller comprises:

a second comparator including a first inverting terminal configured to receive the reference feedback voltage, a second inverting terminal configured to receive the burst reference voltage, and a non-inverting terminal configured to receive the sense signal, compare the burst reference voltage and the voltage of the sense signal, and generate a comparison signal according to the comparison result;

an oscillator configured to generate clock signals, and changing a level of the clock signals in synchronization with the sync signal;

a third flip-flop configured to have a set terminal connected to an output terminal of the oscillator, and receiving the comparison signal through the reset terminal;

a first OR gate configured to receive the fourth signal and the eighth signal;

a second OR gate configured to receive the sixth signal and the seventh signal;

a fourth flip-flop configured to have a set terminal connected to an output terminal of the first OR gate and a reset terminal connected to an output terminal of the second OR gate; and a NOR gate configured to have input terminals respectively connected to an inverting output terminal of the third flip-flop, an output terminal of the fourth flip-flop, and an output terminal of the oscillator, and generating the gate driver control signal.

13. The SMPS of claim 12, wherein:

the fourth flip-flop is configured to generate a high-level ninth signal at the output terminal when the signal input to the set terminal is high level, and to generate a low-level ninth signal at the output terminal when the signal input to the reset terminal is high level;

the third flip-flop is configured to generate a low-level signal at the inverting output terminal when the signal input to the set terminal is high level, and to generate a high-level signal at the inverting output terminal when the signal input to the reset terminal is high level; and the third level is high level, and the fourth level is low level.

14. The SMPS of claim 13, wherein:

the NOR gate is configured to generate a high-level gate driver control signal when the input mode signal is low level, and the gate driver is configured to generate the high-level gate signal corresponding to the high-level gate driver control signal; and the main switch is an n-channel transistor.

15. The SMPS of claim 14, wherein the main switch and the switch controller are respectively configured into separate packages.

16. The SMPS of claim 14, wherein the main switch and the switch controller are configured into a single package.

17. A method for driving a switch mode power supply for converting an input voltage into an output voltage according to the on/off of a main switch, the method comprising:

a) determining a drive mode of the switch mode power supply by comparing a feedback signal and a burst threshold voltage corresponding to the output voltage;

b) counting a number of the switching operations of the main switch when the drive mode is a burst mode according to the determination of (a); and c) maintaining the switching-operation-off-period for longer than a predetermined time when a switching-operation-on-period is finished according to the counting result of (b) so that the main switch remains in off state even when the feedback signal is greater than the burst threshold voltage.

18. The method of claim 17, wherein the switching-operation-off-period includes a switching-operation-forcibly-off-period for preventing the switching operation for the predetermined time, and the switching-operation-off-period further includes d) counting the switching-operation-forcibly-off-period.

19. The method of claim 18, further comprising turning on the main switch in synchronization with the time when the voltage of the main switch is a valley.

* * * * *